United States Patent
Rubin et al.

(10) Patent No.: US 9,154,169 B2
(45) Date of Patent: Oct. 6, 2015

(54) FRACTIONAL SYMBOL BASED PHASE NOISE MITIGATION

(75) Inventors: Amir Rubin, Ranat Gan (IL); Assaf Gurevitz, Ramat Hasharon (IL); Gil Paryanti, Modlin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,785

(22) PCT Filed: Dec. 27, 2011

(86) PCT No.: PCT/US2011/067335
§ 371 (c)(1),
(2), (4) Date: May 20, 2014

(87) PCT Pub. No.: WO2013/100891
PCT Pub. Date: Jul. 4, 2013

(65) Prior Publication Data
US 2014/0247861 A1    Sep. 4, 2014

(51) Int. Cl.
*H04L 27/28* (2006.01)
*H04L 1/02* (2006.01)
(Continued)

(52) U.S. Cl.
CPC ............ *H04B 1/12* (2013.01); *H04L 25/03159* (2013.01); *H04L 25/03993* (2013.01); *H04L 27/2647* (2013.01); *H04L 27/2657* (2013.01);
(Continued)

(58) Field of Classification Search
CPC .............. H04L 27/2647; H04L 5/0007; H04L 27/2657
USPC ................... 375/260, 267, 343; 370/208, 280
See application file for complete search history.

(56) References Cited

U.S. PATENT DOCUMENTS

| | | | |
|---|---|---|---|
| 7,668,269 B2 * | 2/2010 | Ma et al. | 375/350 |
| 7,826,544 B2 | 11/2010 | Bick et al. | |
| 8,488,663 B2 * | 7/2013 | Lo et al. | 375/229 |

FOREIGN PATENT DOCUMENTS

| | | |
|---|---|---|
| EP | 1706976 B1 | 12/2008 |
| WO | 2013100891 A1 | 7/2013 |

OTHER PUBLICATIONS

International Preliminary Report on Patentability and Written Opinion received for PCT Patent Application No. PCT/US20111067335, mailed on Jul. 10, 2014, 5 pages.
(Continued)

*Primary Examiner* — Khai Tran
(74) *Attorney, Agent, or Firm* — Garrett IP, LLC (57) ABSTRACT

Fractional symbol based phase noise mitigation, including methods and systems to determine phase noise trajectory, or indication of phase noise, for each of multiple fractional portions of a frequency domain symbol, and modify the symbol based on the phase noise trajectories of the subsets. Multiple correction hypotheses may be generated for each fractional portion of the symbol based on pre-defined phase noise hypotheses. The correction hypotheses may include frequency domain correction hypotheses. The correction hypotheses for a subset may be evaluated to select one of the phase noise hypotheses as the trajectory for the subset. The evaluation may include applying each correction hypothesis to a corresponding equalized frequency domain symbol to generate corresponding symbol hypotheses, computing a signal quality for each symbol hypothesis, and comparing the signal qualities. Signal qualities may be determined as error vector magnitudes, and may be based on all or a subset of corresponding symbol tones.

20 Claims, 8 Drawing Sheets

(51) Int. Cl.
  H04B 1/12 (2006.01)
  H04L 27/26 (2006.01)
  H04L 25/03 (2006.01)
  H04L 27/00 (2006.01)
(52) U.S. Cl.
  CPC ....... *H04L 27/2671* (2013.01); *H04L 2027/003* (2013.01); *H04L 2027/0034* (2013.01); *H04L 2027/0038* (2013.01); *H04L 2027/0046* (2013.01); *H04L 2027/0067* (2013.01); *H04L 2027/0085* (2013.01)

(56) References Cited

OTHER PUBLICATIONS

International Search Report and Written Opinion received for International Application No. PCT/US2011/67335, mailed on May 31, 2012, 8 pages.

\* cited by examiner

FRACTIONAL SYMBOL BASED PHASE NOISE MITIGATION

BACKGROUND

Frequency domain filters have been proposed to mitigate phase noise in orthogonal frequency division multiplex (OFDM). A frequency domain filter may address general characteristics of phase noise but may not adequately mitigate phase domain in some situations.

BRIEF DESCRIPTION OF THE DRAWINGS/FIGURES

In the drawings, the leftmost digit(s) of a reference number identifies the drawing in which the reference number first appears.

DETAILED DESCRIPTION

Figure 1:
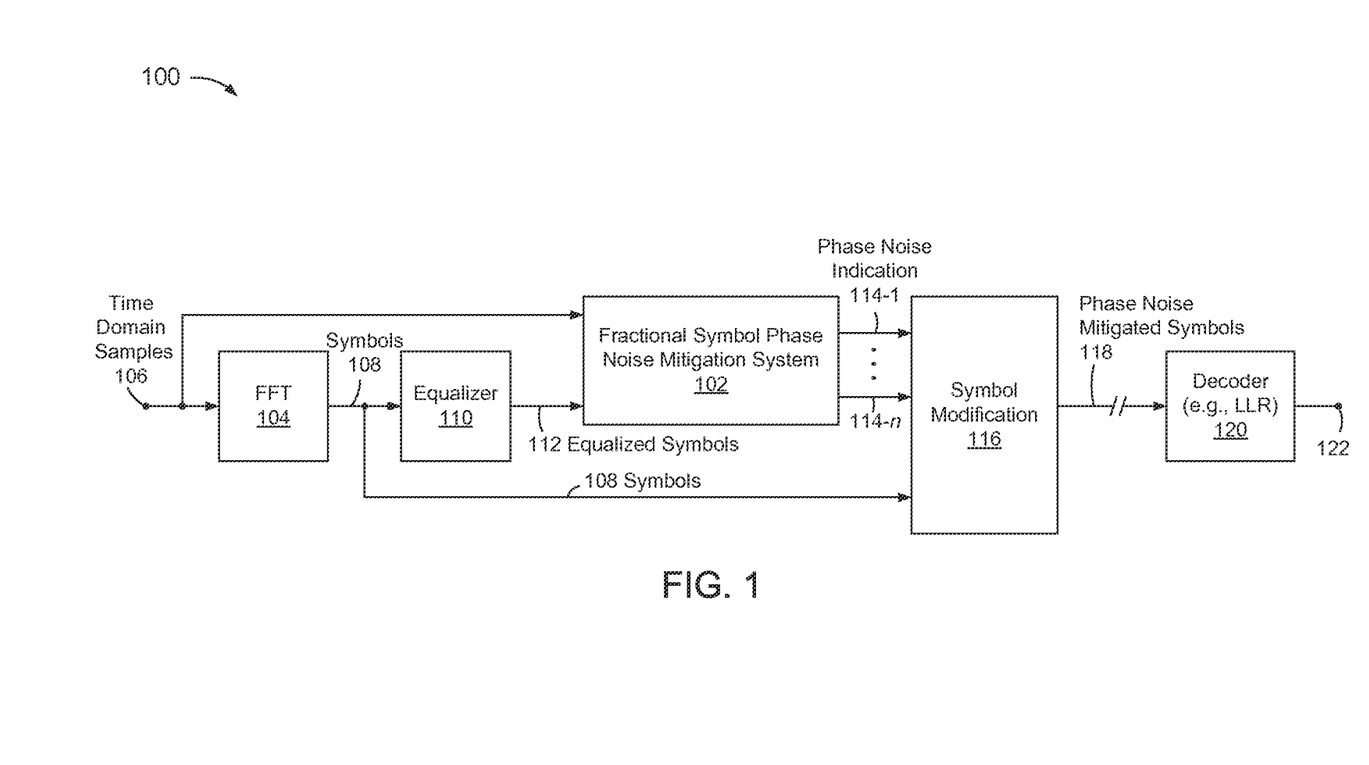
FIG. 1 is a block diagram of receiver system including a fractional symbol phase noise mitigation system to mitigate phase noise in frequency domain symbols based on evaluations of fractional portions of the symbols.

FIG. 1 is a block diagram of receiver system 100 including a fractional symbol phase noise mitigation system (mitigation system) 102 to mitigate phase noise in frequency domain symbols based on evaluations of fractional portions of the symbols.

Receiver system 100 may include a fast Fourier transform (FFT) module 104 to convert sets of time domain samples 106 to corresponding frequency domain symbols 108. Time domain samples 106 may correspond to an orthogonal frequency division multiplexed (OFDM) signal.

Receiver system 100 may include an equalizer 110 to equalize frequency domain tones of symbols 108 and output corresponding equalized symbols 112.

Mitigation system 102 may be implemented to evaluate each of multiple fractional portions of an OFDM symbol to determine a most likely phase noise trajectory for each fractional portion. The fractional portions of the symbol may correspond to time domain periods of the symbol.

Mitigation system 102 may be implemented to evaluate each fractional portion of the symbol with respect to multiple hypotheses of phase offset values, and to select one of the hypotheses as the most likely phase noise behavior for the corresponding time domain period. The evaluation of the phase noise hypotheses may include a maximum likelihood time domain technique.

The evaluation of the phase noise hypotheses may include applying a hypothesis to a subset of time domain samples to generate a correction hypothesis, applying the correction hypothesis to a corresponding equalized symbol to generate a symbol hypothesis, computing a signal quality of the symbol hypothesis, and evaluating the signal quality relative to a signal quality of the equalized symbol and/or a signal quality of one or more other symbol hypothesis. The correction hypothesis may be generated as a frequency domain correction hypothesis, and may be zero-padded to a length of the equalized symbol. Signal qualities may be computed as a phase noise trajectory, may be computed as an error vector magnitude (EVM), and may be computed from all or a subset of frequency domain tones of the corresponding symbol. The hypothesis that corresponds to the best signal quality may be selected as the phase noise indication 114 for the subset of time domain samples.

In FIG. 1, mitigation system 102 may be implemented to partition each set of time domain samples 106 into n subsets of contiguous time domain samples and determine a phase noise indication 114 for each subset. Phase noise indications 114 may represent phase noise trajectories of a corresponding subset of time domain samples.

Receiver system 100 may include a symbol modification module 116 to modify symbols 108 based on phase noise indications 114, and a decoder 120 to decode information 122 phase noise mitigated symbols 118. Decoder 120 may include a log likelihood ratio (LLR) decoder.

Hypothesis testing of fractional portions of an OFDM symbol may permit testing of relatively numerous hypotheses and/or complex hypotheses.

Hypothesis testing of fractional portions of an OFDM symbol may improve gain, and may reduce cost and latency.

Hypothesis testing of fractional portions of an OFDM symbol may be performed in parallel.

Figure 2:
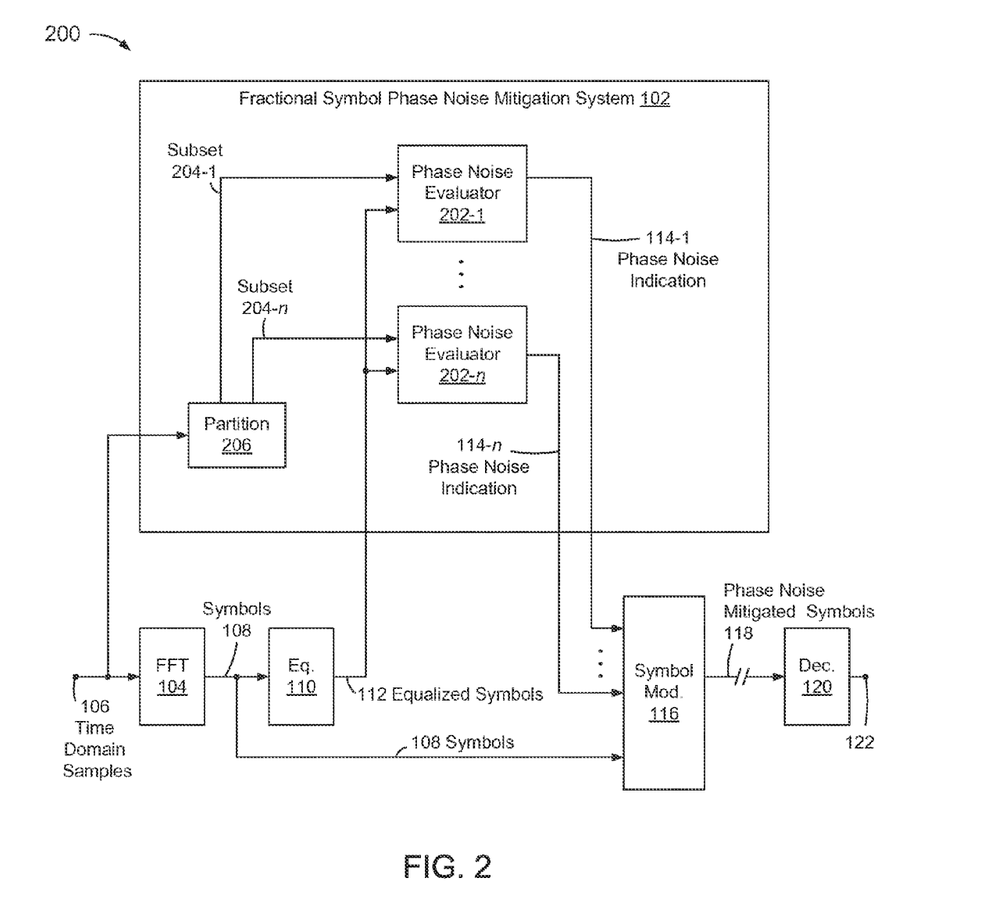
FIG. 2 is a block diagram of a receiver system including multiple phase noise evaluators, each to evaluate a corresponding time domain portion of a symbol.

FIG. 2 is a block diagram of receiver system 200, including features described above with reference to FIG. 1, where mitigation system 102 includes n phase noise evaluators 202, each to evaluate a corresponding subset of time domain samples 204 of a symbol 108 and output a corresponding phase noise indication 114. Phase noise evaluators 202 may be implemented to process subsets of time domain samples 204 in a multi-threaded and/or parallel environment.

Mitigation system 102 may include a partition module 206 to partition time domain samples 106 into subsets 204-1 through 204-$n$. The number of subsets n may be fixed or configurable, and may be based on one or more implementation considerations, environmental factors and/or other factors.

In FIG. 1 and/or FIG. 2, mitigation system 102 may be implemented to evaluate subsets of time domain samples with respect to one or more pre-defined phase noise hypotheses, such as described below with reference to FIG. 3.

Figure 3:
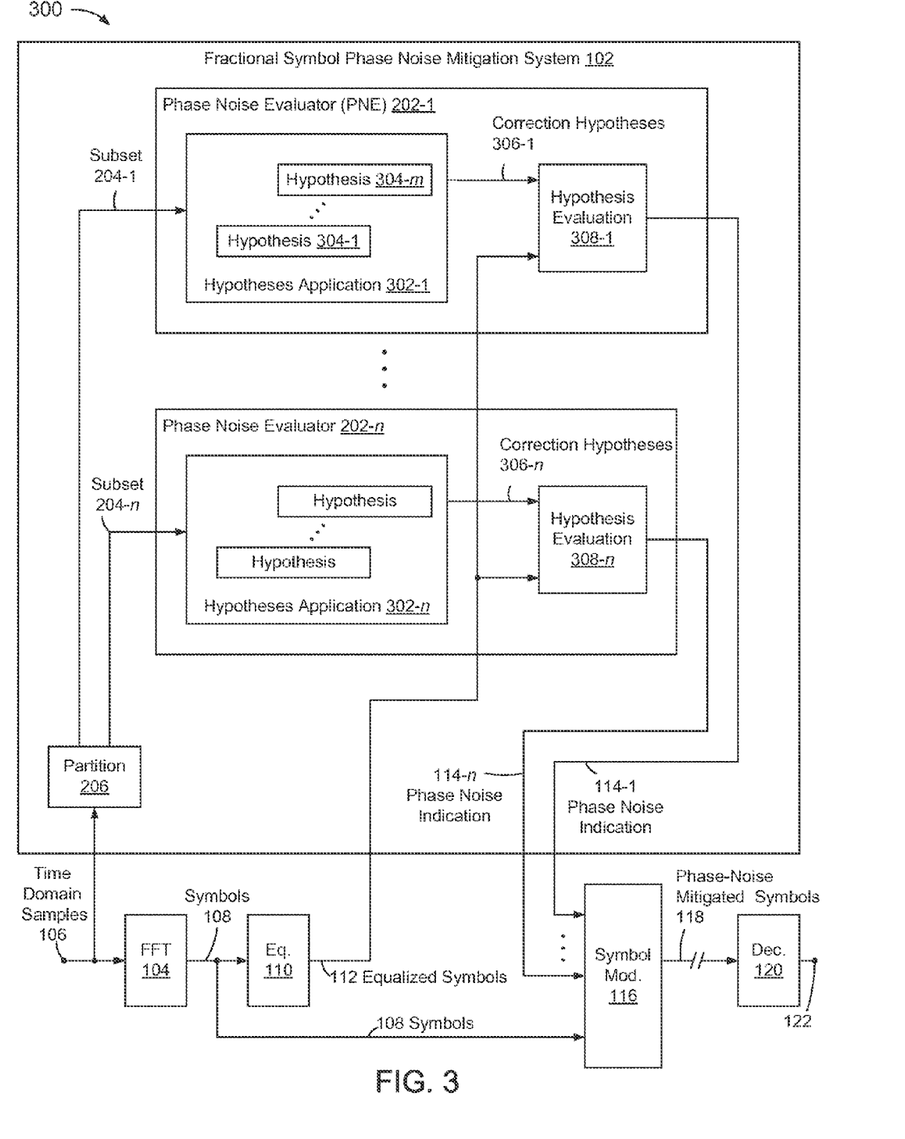
FIG. 3 is a block diagram of a receiver system to fractional portions of a symbol with respect to one or more pre-defined phase noise hypotheses.

FIG. 3 is a block diagram of receiver system 300, including features described above with reference to FIGS. 1 and 2, to evaluate subsets of time domain samples 106 with respect to one or more pre-defined phase noise hypotheses.

In FIG. 3, phase noise evaluators 216 each include a hypothesis application module 302 and a hypothesis evaluation module 308. Hypothesis application module 302-1 and hypothesis evaluation module 308-1 are described below. One or more other hypothesis application modules 302 may be configured similar to hypothesis application module 302-1, and one or more other hypothesis evaluation modules 308 may be configured similar to hypothesis application module 308-1.

Hypothesis application module 302-1 may be implemented to evaluate a subset of time domain samples 204-1 with respect to one or more pre-defined phase noise hypotheses 304, and output a correction hypothesis 306-1 for each applied hypothesis 304. A correction hypothesis 306-1 may include a frequency domain correction hypothesis.

In the example of FIG. 3, hypothesis application module 302-1 includes m hypotheses, 304-1 through 304-m. Hypothesis application module 302-1 may be implemented to apply each of the m hypotheses to a subset of time domain samples 204-1, or a portion of the m hypothesis.

Where hypothesis application module 302-1 applies multiple hypotheses 304 to subset 204-1, hypothesis application module 302-1 may output multiple corresponding correction hypotheses 306-1.

A hypothesis 304 may include a hypothesis value.

A hypothesis 304 or a hypothesis value may be based on a pre-determined characteristic, which may include a pre-determined and/or estimated channel noise factors such as coherency time, which may be defined as a time duration over which a channel impulse response is relatively consistent or non-varying.

A hypothesis 304 may be implemented, constructed, and/or configured based on one or more implementation considerations, environmental conditions, and/or other characteristics, parameters and/or variables.

A hypothesis 304 may include a constant phase noise hypothesis value.

Multiple hypotheses 304 may each include a corresponding one of multiple alternative constant phase noise values.

A hypothesis 304 may include a zero phase noise hypothesis.

A hypothesis 304 may include an auto correlation or adaptive function implemented to converge based on one or more parameters such as, for example, a measured, estimated, and/or derived channel quality or channel quality indication, which may be expressed as an error vector magnitude (EVM).

Hypothesis application module 302-1 may be implemented to apply a hypothesis 304 in the time domain. For example, where a hypothesis 304 includes a constant phase noise hypothesis value, hypothesis module 302-1 may rotate subset of time domain samples 204-1 by the constant phase noise hypothesis value to provide a modified subset of time domain samples. Hypothesis application module 302-1 may be further implemented to convert the modified subset of time domain samples to a frequency domain to provide a corresponding frequency domain correction hypothesis 306-1.

Alternatively, or additionally, hypothesis application module 302-1 may be implemented to convert subset of time domain samples 204-1 to the frequency domain to apply a frequency domain hypothesis 304 to provide a corresponding a frequency domain correction hypothesis 306-1.

Hypothesis application module 302-1 may be implemented to zero-pad a frequency domain correction hypothesis 306-1 to a length of a corresponding symbol 108 or equalized symbol 112.

Hypothesis evaluation module 308-1 is now described.

Hypothesis evaluation module 308-1 may be implemented to evaluate multiple correction hypotheses 306-1 generated from sample subset 204-1. The evaluations may be based on associated signal qualities. For example, hypothesis evaluation module 308-1 may be implemented to generate a symbol hypothesis for each correction hypothesis 306-1, and compute a received signal quality for each symbol hypothesis.

Hypothesis evaluation module 308-1 may be further implemented to identify a best one of the multiple correction hypotheses 306-1 based on the evaluations, and to select the corresponding hypothesis 304 as the most likely noise channel or phase noise trajectory for sample subset 204-1. The selected hypothesis 304 may be output as phase noise indication 114-1.

Figure 4:
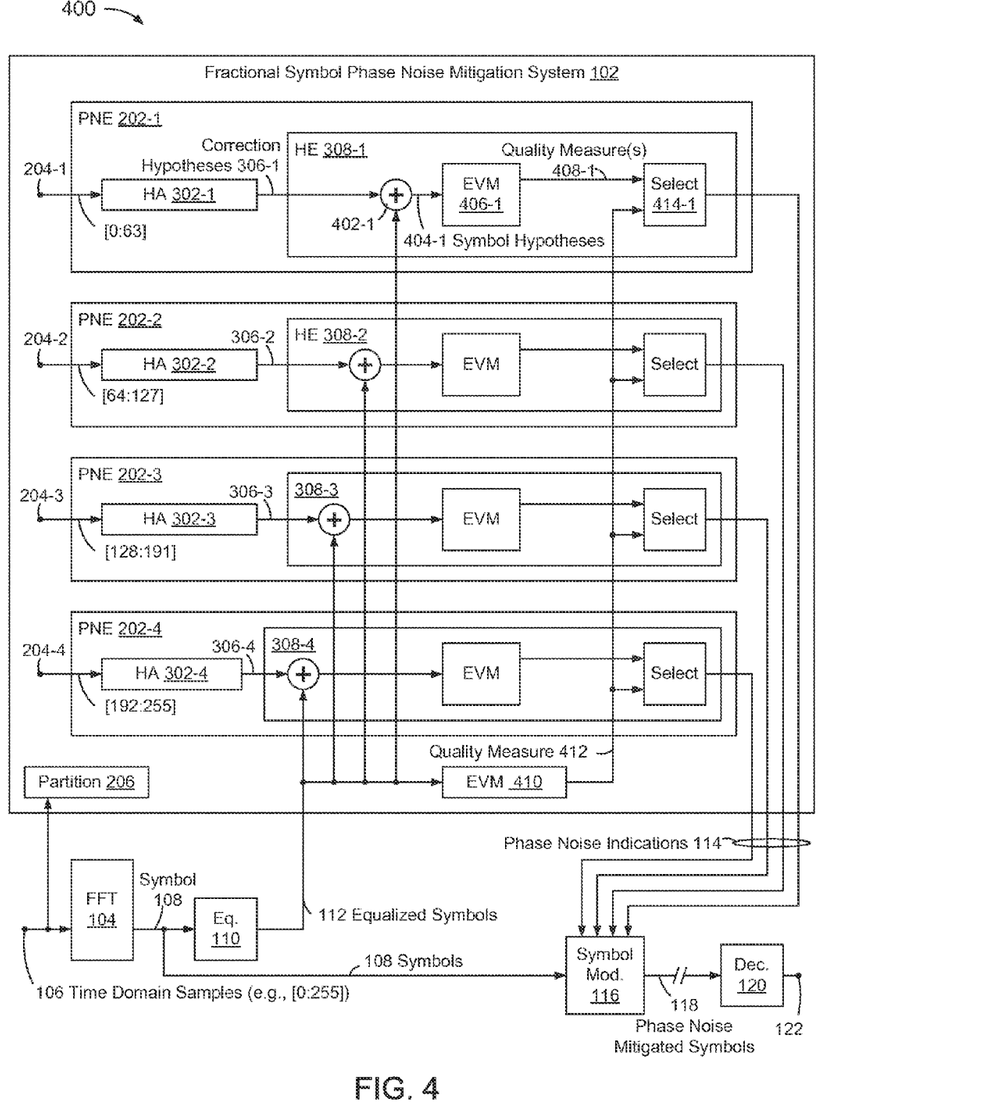
FIG. 4 is a block diagram of a receiver system including multiple hypothesis evaluation modules, each to evaluate signal qualities of correction hypotheses for a corresponding fractional symbol portion relative to a signal quality of an equalized symbol.

FIG. 4 is a block diagram of receiver system 400, including features described above with respect to FIGS. 1, 2, and 3, where hypothesis evaluation modules (HEs) 308 are implemented to evaluate a received signal quality for each correction hypothesis 306, relative to a received signal quality of a corresponding equalized symbol 112.

In the example of FIG. 4, FFT 104 may include a 256 bit FFT to convert a set of 256 time domain samples 106 to a frequency domain symbol 108, and partition module 206 may be implemented to partition the 256 time domain samples 106 into 4 subsets of 64 samples, illustrated here as subsets 204-1 (sample bits [0:63]), 204-2 (sample bits [64:127]), 204-3 (sample bits [128:191]), and 204-4 (sample bits [192:255]). Methods and systems disclosed herein are not limited to these examples.

Hypothesis evaluation module 308-1 is described below. Hypothesis evaluation modules 308-2 through 308-4 may be implemented similar to hypothesis evaluation module 308-1.

Hypothesis evaluation module 308-1 may include logic 402-1 to apply or combine each frequency domain correction hypothesis 306-1 with a corresponding equalized symbol 112, to provide a symbol hypothesis 404-1 for each correction hypothesis 306-1.

Hypothesis evaluation module 308-1 may further include a characterization module to characterize each symbol hypothesis 404-1 and output a corresponding quality measure for each symbol hypothesis 404-1. The characterization module may be implemented to compute a signal quality or phase noise trajectory, which may be represented as an error vector magnitude (EVM). In the example of FIG. 4, the characterization module is illustrated as an EVM module 406-1 to compute quality measures 408-1.

EVM module 406 may be implemented to determine a received signal quality based on all FFT tones of a symbol hypothesis 404-1, or a subset thereof. A subset of FFT tones or bins may be selected based on an on estimated channel of one or more corresponding sub-carriers, and/or may be based on efficiency and/or and latency.

Hypothesis evaluation module 308-1 may further include a selector module 414-1 to identify one of multiple quality measures 408-1 as a best quality measure, and may output the corresponding hypothesis 304 (FIG. 3) as phase noise indication 114-1.

Selector module 414-1 may be implemented to compare each quality measure 408-1 to a quality measure 412 of the corresponding equalized symbol 112. Mitigation system 102 may include another characterization module, illustrated herein as an EVM module 410, to generate signal quality measure 412. EVM module 410 may be implemented as described above with respect to EVM module 406-1.

Where the quality measure 412 of the equalized symbol 112 is better than all quality measures 408-1 of sample subset 204-1, selector 414-1 may output equalized symbol 112, or a portion thereof, as phase noise indication 114-1.

In FIGS. 1 through 4, equalizer 110, mitigation system 102, and/or symbol modification module 116 may be synchronous or asynchronous with one another, and may be synchronous with different clock periods. Further with respect to FIG. 4, equalizer 110, EVM modules 406, and/or symbol modification module 116 may be synchronous or asynchronous with one another, and may be synchronous with different clock periods.

Figure 5:
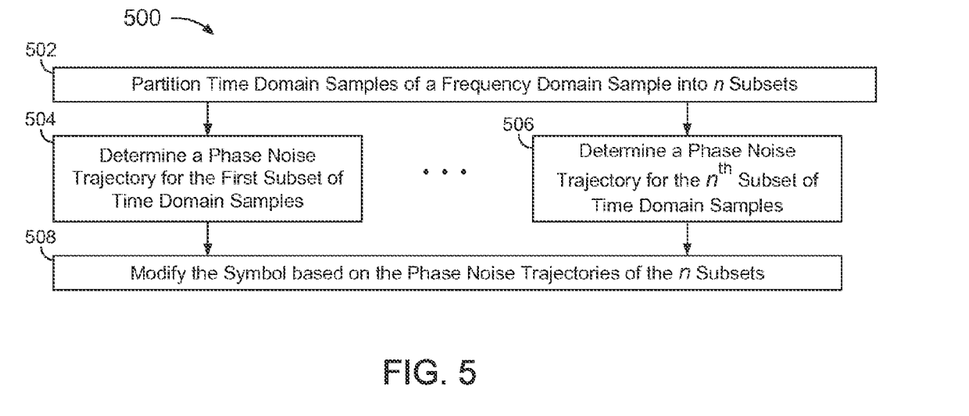
FIG. 5 is a flowchart of a method of mitigating phase noise in a frequency domain symbol based on evaluations of fractional portions of the symbol.

FIG. 5 is a flowchart of a method 500 of mitigating phase noise in a frequency domain symbol based on evaluations of fractional portions of the symbol.

At 502, time domain samples of a frequency domain symbol are partitioned into n subsets of time domain samples.

At 504, a first one of the n subsets of time domain samples is evaluated to determine a phase noise trajectory, such as described in one or more examples above. Remaining ones of the n subsets of time domain samples may be evaluated in a similar fashion, and may be evaluated in parallel as illustrated at 506.

At 508, the frequency domain symbol is modified based on the n phase noise indications to provide a phase noise mitigated symbol, such as described in one or more examples above.

Figure 6:
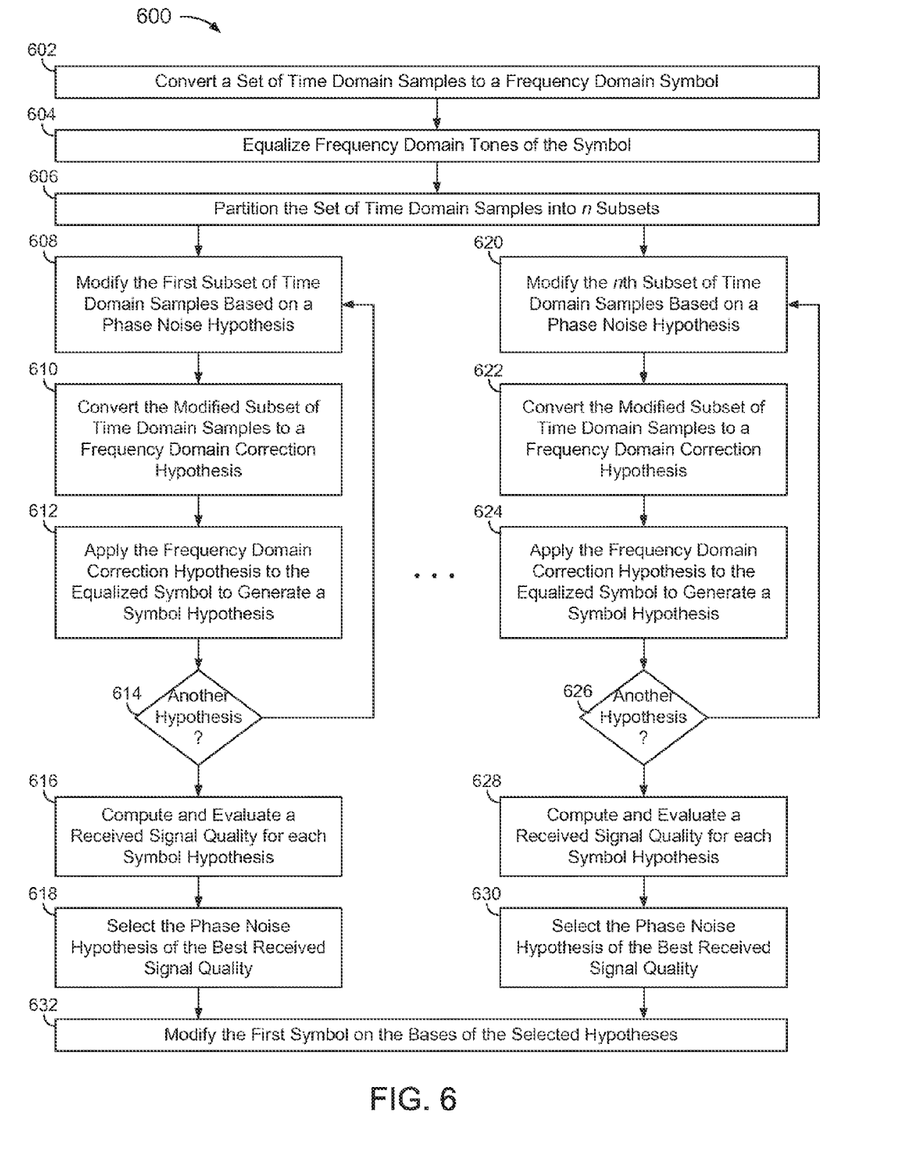
FIG. 6 is a flowchart of a method of mitigating phase noise in a frequency domain symbol based on evaluations of fractional portions of the symbol with respect to multiple pre-defined phase noise hypotheses.

FIG. 6 is a flowchart of a method 600 of mitigating phase noise in a frequency domain symbol based on evaluations of fractional portions of the symbol with respect to multiple pre-defined phase noise hypotheses.

At 602 a set of time domain samples is converted to a frequency domain symbol.

At 604, frequency domain tones of the symbol are equalized.

At 606, the set of time domain samples is partitioned into n subsets of time domain samples.

At 608, a first one of the n subsets of time domain samples is modified based on a phase noise hypothesis, such as described in one or more examples above.

At 610, the modified subset of time domain samples is converted to the frequency domain as a frequency domain correction hypothesis. The frequency domain correction hypothesis may be zero-padded to a length of the equalized symbol.

At 612, the frequency domain correction hypothesis is applied to the equalized symbol to generate a symbol hypothesis, such as described in one or more examples above.

At 614, processing may return to 608 to modify the first set of time domain samples based on another phase noise hypothesis.

At 616, a received signal quality measure is computed for the equalized symbol and for each symbol hypothesis, such as described in one or more examples above. The received signal quality may be based on all or a subset of tones of the corresponding symbol.

At 618, a best one of the signal qualities is identified, and the corresponding or underlying hypothesis is selected as a phase noise trajectory of the first subset of time domain samples.

Remaining ones of the n subsets of time domain samples may be evaluated in a similar fashion, and may be evaluated in parallel as illustrated at 620 through 630.

At 632, the frequency domain symbol is modified based on the selected hypotheses of the n subsets of time domain samples, such as described with respect to one or more examples above.

Methods and systems disclosed herein may be implemented in hardware, software, firmware, and/or combinations thereof, including discrete and integrated circuit logic, application specific integrated circuit (ASIC) logic, processor, controllers, and/or microcontrollers, and may be implemented as part of a domain-specific integrated circuit package, and/or a combination of integrated circuit packages.

Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Figure 7:
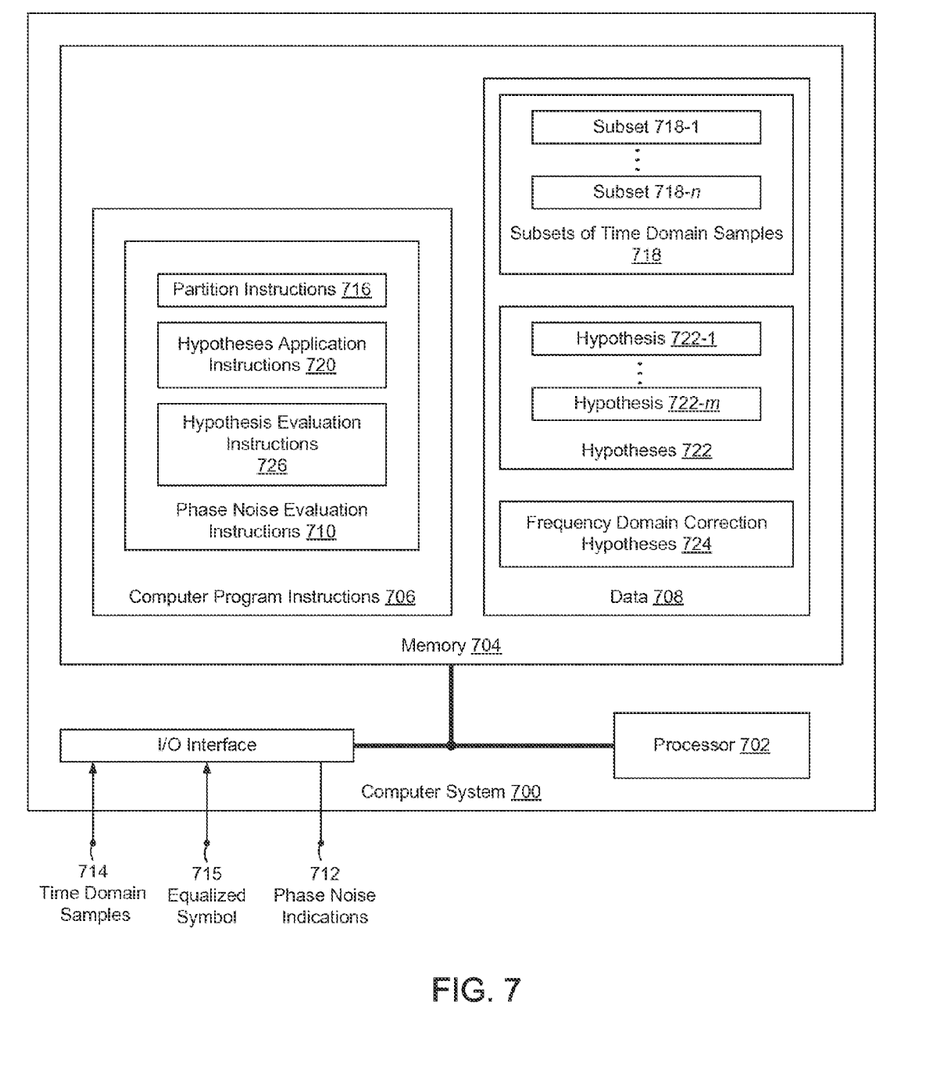
FIG. 7 is a block diagram of a processor system configured as fractional symbol phase noise mitigation system.

FIG. 7 is a block diagram of a processor system 700 configured as fractional symbol phase noise mitigation system.

Processor system 700 may include one or more instruction processing units, illustrated here as a processor 702, which may include a processor, a processor core, or a micro-controller.

Computer system 700 may include memory, cache, registers, and/or storage, illustrated here as memory 704.

Memory 704 may include a non-transitory computer readable medium encoded with a computer program, including instructions 706.

Memory 704 may include data 708 to be used by processor 702 in executing instructions 706, and/or generated by processor 702 during execution of instructions 706. Data 708 may include one or more of time domain samples 714 of a frequency domain symbol and a corresponding equalized symbol 715. Time domain samples 714 may correspond to an OFDM signal.

Instructions 706 may include phase noise evaluation instructions 710 to cause processor 702 to determine a phase noise trajectory for each of multiple subsets of time domain samples 714. The phase noise trajectories are illustrated here as phase noise indications 712.

Phase noise evaluation instructions 710 may include partition instructions 716 to cause processor 702 to partition time domain samples 714 into n subsets of time domain samples 718, such as described in one or more examples above.

Phase noise evaluation instructions 710 may include hypothesis application instructions 720 to cause processor 702 to apply one or more phase noise hypotheses 722 to each subset of time domain samples 718, and generate corresponding frequency domain correction hypotheses 724, such as described in one or more examples above.

Phase noise evaluation instructions 710 may include hypothesis evaluation instructions 726 to cause processor 702 to evaluate frequency domain correction hypotheses 724, and select a hypothesis 722 for each subset of time domain samples 718 based on the evaluations, such as described in one or more examples above.

Computer system 700, hypothesis application instructions 720, and hypothesis evaluation instructions 726, or portions thereof, may be implemented process subsets of time domain samples 718 in parallel with one another.

Instructions 706 may include additional instructions such as, for example, FFT instructions to convert time domain samples 714 to a frequency domain symbol, equalization instructions to equalize frequency tones of the symbol to provide equalized symbol 715, symbol modification instructions to modify the frequency domain symbol based on phase noise indications 712, and/or decoding instructions to decode information from multiple phase noise mitigated symbols, such as described in one or more examples above.

A fractional symbol phase noise mitigation system may be implemented with respect to one or more of a variety of communication devices, such as described below with reference to FIG. 8.

Figure 8:
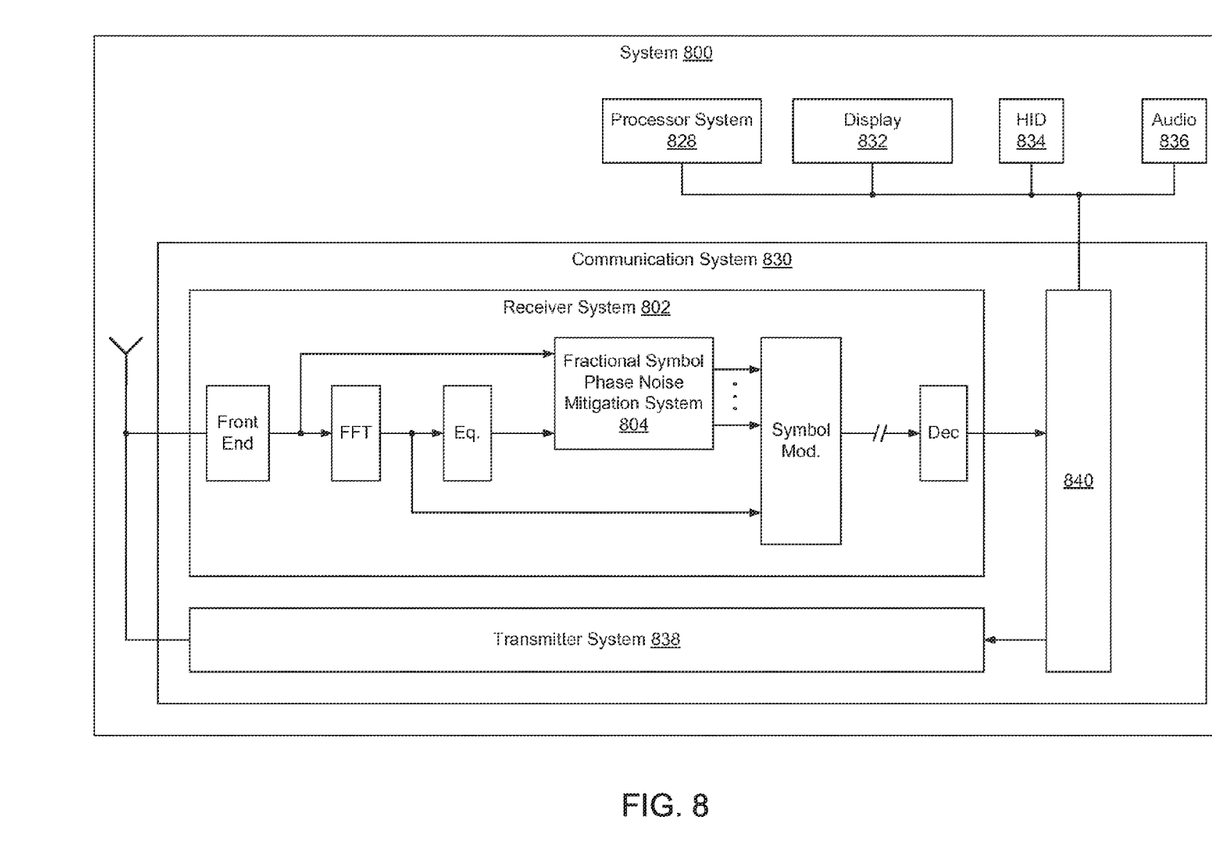
FIG. 8 is a block diagram of a system including a fractional symbol phase noise mitigation system, where the system may correspond to, for example, a computer system and/or personal communication device.

FIG. 8 is a block diagram of a system 800 including a fractional symbol phase noise mitigation system (mitigation system) 804. System 800 may correspond to, for example, a computer system and/or personal communication device.

System 800 may include a processor system 828.

System 800 may further include a monitor or display 832 to display information from processor system 830.

System 800 may further include a human interface device (HID) 834 to provide user input to processor system 830. HID 834 may include, for example and without limitation, one or more of a key board, a cursor device, a touch-sensitive device, and or a motion and/or image sensor. HID 834 may include a physical device and/or a virtual device, such as a monitor-displayed or virtual keyboard.

System 800 may include an audio system 836 to receive and/or output audible sound.

System 800 includes a communication system, including a receiver system 802 and mitigation system 804. Receiver system 802 and/or portions thereof may be implemented as described with respect to one or more examples above. Communication system 830 may further include a transmitter system 838. Communication system 830 may further include an interface 840 to communicate with one or more of processor system 828, display 832, HID 834, and or audio system 836.

Communication system 830 may be implemented to communicate wirelessly with one or more systems and/or networks, which may include a data network and/or a voice or telephone network.

System 800 may include a housing to receive processor system 828, communication system 830, display 832, audio system 836, and HID 834 and/or an interface thereto. The housing may include, without limitation, a rack-mountable housing, a desk-top housing, a lap-top housing, a notebook housing, a net-book housing, a set-top box housing, a portable housing, and/or other conventional electronic housing and/or future-developed housing, System 800 may correspond to, for example and without limitation, a computer system, a server system, and/or a hand-held processor and/or communication device. System 800 may further include a battery system to provide power to one or more of processor system 828, communication system 830, display 832, audio system 836, and HID 834.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. An apparatus, comprising:
 a fractional symbol phase noise mitigation system that includes,
  a partition module to partition time domain samples of a frequency domain symbol into subsets of time domain samples,
  a phase noise evaluator to evaluate each subset of time domain samples with respect to multiple phase noise hypotheses to provide multiple corresponding phase noise correction hypotheses for each subset of time domain samples, and select one of the phase noise correction hypotheses as a phase noise indication of the respective subset of time domain samples, and
  a symbol modifier modify the symbol based on the phase noise indications of the respective subsets of time domain samples.

2. The apparatus of claim 1, wherein the phase noise evaluator includes:
 multiple phase noise evaluators, each to evaluate a corresponding one of the subsets of time domain samples with respect to the multiple phase noise hypotheses.

3. The apparatus of claim 2, wherein the phase noise hypotheses include one or more of:
 a pre-determined channel noise factor;
 an estimated channel noise factor;
 a period of time for which a channel impulse response is non-varying;
 a constant phase noise phase hypothesis;
 a zero phase noise phase hypothesis;
 an adaptive function configured to converge based on one or more parameters indicative of a channel quality;
 a time domain phase noise phase hypothesis; and
 a frequency domain phase noise phase hypothesis.

4. The apparatus of claim 1, wherein the phase noise evaluator is configured to provide the correction hypotheses as frequency domain correction hypotheses.

5. The apparatus of claim 1, wherein the phase noise evaluator is configured to:
 modify each subset of time domain samples based on each of the phase noise hypotheses to generate multiple corresponding modified subsets of time domain samples; and
 convert the modified subsets of time domain samples to respective frequency domain correction hypotheses.

6. The apparatus of claim 4, further including an equalizer to equalize tones of the frequency domain symbol, wherein the fractional symbol phase noise mitigation system is further configured to:
 apply each of the frequency domain correction hypotheses to the equalized symbol to generate multiple corresponding symbol hypotheses; and
 compute and evaluate a signal quality for each of the symbol hypotheses.

7. The apparatus of claim 6, wherein the fractional symbol phase noise mitigation system is further configured to compare a computed signal quality of the equalized symbol to the computed signal qualities of each of the symbol hypotheses.

8. A system, comprising:
 a communication system including a receiver to receive and decode an orthogonal frequency division multiplex signal and provide corresponding decoded information to the processor, wherein the receiver includes a processor and memory configured to,
  partition time domain samples of a frequency domain symbol into multiple subsets of time domain samples,
  evaluate each subset of time domain samples with respect to multiple phase noise hypotheses to provide multiple corresponding phase noise correction hypotheses for each subset of time domain samples,
  select one of the phase noise correction hypotheses as a phase noise indication of the respective subset of time domain samples, and modify the symbol based on the phase noise indications of the multiple subsets of time domain samples.

9. The system of claim 8, wherein the processor and memory are further configured to:

evaluate the subsets of time domain samples in one or more of parallel environment and a multi-threaded environment.

10. The system of claim 8, wherein the phase noise hypotheses include one or more of:
- a pre-determined channel noise factor;
- an estimated channel noise factor;
- a period of time for which a channel impulse response is non-varying;
- a constant phase noise phase hypothesis;
- a zero phase noise phase hypothesis;
- an adaptive function configured to converge based on one or more parameters indicative of a channel quality;
- a time domain phase noise phase hypothesis; and
- a frequency domain phase noise phase hypothesis.

11. The system of claim 8, wherein the processor and memory are further configured to provide the correction hypotheses as frequency domain correction hypotheses.

12. The system of claim 8, wherein the processor and memory are further configured to:
- modify each subset of time domain samples based on each of the phase noise hypotheses to generate multiple corresponding modified subsets of time domain samples; and
- convert the modified subsets of time domain samples to corresponding frequency domain correction hypotheses.

13. The system of claim 11, wherein the receiver further includes an equalizer to equalize tones of the frequency domain symbol, and wherein the processor and memory are further configured to:
- apply each of the frequency domain correction hypotheses to the equalized symbol to generate multiple corresponding symbol hypotheses; and
- compute and evaluate a signal quality for each of the symbol hypotheses.

14. A non-transitory computer readable medium encoded with a computer program, including instructions to cause a processor to:
- partition time domain samples of a frequency domain symbol into multiple subsets of time domain samples;
- evaluate each subset of time domain samples with respect to multiple phase noise hypotheses to provide multiple corresponding phase noise correction hypotheses for each subset of time domain samples, select one of the phase noise correction hypotheses as a phase noise indication of the respective subset of time domain samples; and
- modify the symbol based on the phase noise indications of the multiple subsets of time domain samples.

15. The computer readable medium of claim 14, wherein the instructions include instructions to cause the processor to:
- evaluate the subsets of time domain samples in one or more of parallel environment and a multi-threaded environment.

16. The computer readable medium of claim 14, wherein the phase noise hypotheses include one or more of:
- a pre-determined channel noise factor;
- an estimated channel noise factor;
- a period of time for which a channel impulse response is non-varying;
- a constant phase noise phase hypothesis;
- a zero phase noise phase hypothesis;
- an adaptive function configured to converge based on one or more parameters indicative of a channel quality;
- a time domain phase noise phase hypothesis; and
- a frequency domain phase noise phase hypothesis.

17. The computer readable medium of claim 14, further including instructions to cause the processor to:
- generate the multiple phase noise correction hypotheses as frequency domain correction hypotheses.

18. The computer readable medium of claim 14, further including instructions to cause the processor to:
- modify the each subset of time domain samples based on each of the phase noise hypotheses to generate multiple corresponding modified subsets of time domain samples; and
- convert the modified subsets of time domain samples to corresponding frequency domain correction hypotheses.

19. The computer readable medium of claim 17, further including instructions to cause the processor to:
- apply each of the frequency domain correction hypotheses to an equalized version of the symbol to generate multiple corresponding symbol hypotheses; and
- compute and evaluate a signal quality for each of the symbol hypotheses.

20. The computer readable medium of claim 19, further including instructions to cause the processor to:
- compare a computed signal quality of the equalized symbol to the computed signal qualities of each of the symbol hypotheses.

* * * * *